United States Patent
Rahim et al.

[11] Patent Number: 5,946,656
[45] Date of Patent: Aug. 31, 1999

[54] SPEECH AND SPEAKER RECOGNITION USING FACTOR ANALYSIS TO MODEL COVARIANCE STRUCTURE OF MIXTURE COMPONENTS

[75] Inventors: Mazin G. Rahim, Matawan; Lawrence K. Saul, Cranbury, both of N.J.

[73] Assignee: AT & T Corp., Middletown, N.J.

[21] Appl. No.: 08/971,838

[22] Filed: Nov. 17, 1997

[51] Int. Cl.[6] .................................................... G01L 9/16
[52] U.S. Cl. .......................................... 704/256; 704/240
[58] Field of Search ................................... 704/236, 240, 704/256

[56] References Cited

U.S. PATENT DOCUMENTS

| | | | |
|---|---|---|---|
| 4,038,503 | 7/1977 | Moshier | 704/234 |
| 5,473,728 | 12/1995 | Luginbuhl et al. | 704/243 |
| 5,555,344 | 9/1996 | Zunkler | 704/242 |
| 5,579,436 | 11/1996 | Chou et al. | 704/244 |
| 5,590,242 | 12/1996 | Juang et al. | 704/245 |

OTHER PUBLICATIONS

Ghahramani et al. "The EM Algorithm for Mixtures of Factor Analyzers", Technical Report CRG–TR–96–1, May 21, 1996, pp. 1–8. University of Toronto.

Hinton et al. "Modelling the Manifolds of Images of Handwritten Digits", Dept. of Computer Science, (IEEE trans. on Neural Networks), pp. 1–29.

E. Gunter Schukat–Talamazzini, Joachim Hornegger, and Heinrich Niemann, "Optimal Linear Feature Transformations for Semi–Continuous Hidden Markov Models," Proc. IEEE ICASSP 95, vol. 1, pp. 369–372, May 1995.

Primary Examiner—David D. Knepper
Assistant Examiner—Tālivaldis Ivars Šmits

[57] ABSTRACT

Hidden Markov models (HMMs) rely on high-dimensional feature vectors to summarize the short-time properties of speech correlations between features that can arise when the speech signal is non-stationary or corrupted by noise. These correlations are modeled using factor analysis, a statistical method for dimensionality reduction. Factor analysis is used to model acoustic correlation in automatic speech recognition by introducing a small number of parameters to model the covariance structure of a speech signal. The parameters are estimated by an Expectation Maximization (EM) technique that can be embedded in the training procedures for the HMMs, and then further adjusted using Minimum Classification Error (MCE) training, which demonstrates better discrimination and produces more accurate recognition models.

28 Claims, 2 Drawing Sheets

SPEECH AND SPEAKER RECOGNITION USING FACTOR ANALYSIS TO MODEL COVARIANCE STRUCTURE OF MIXTURE COMPONENTS

FIELD OF THE INVENTION

This invention relates generally to recognition, and more particularly to speech and speaker recognition using factor analysis.

BACKGROUND OF THE INVENTION

Speech recognition is a process by which an unknown speech utterance (usually in the form of a digital PCM signal) is identified. Generally, speech recognition is performed by comparing the features of an unknown utterance to the features of known words or word strings.

The features of known words or word strings are determined with a process known as "training". Through training, one or more samples of known words or strings (training speech) are examined and their features (or characteristics) recorded as reference patterns (or recognition models) in a database of a speech recognizer. Typically, each recognition model represents a single known word. However, recognition models may represent speech of other lengths such as subwords (e.g., phones, which are the acoustic manifestation of linguistically-based phonemes). Recognition models may be thought of as building blocks for words and strings of words, such as phrases or sentences.

To recognize an utterance in a process known as "testing", a speech recognizer extracts features from the utterance to characterize it. The features of the unknown utterance are referred to as a test pattern. The recognizer then compares combinations of one or more recognition models in the database to the test pattern of the unknown utterance. A scoring technique is used to provide a relative measure of how well each combination of recognition models matches the test pattern. The unknown utterance is recognized as the words associated with the combination of one or more recognition models which most closely matches the unknown utterance.

Recognizers trained using both first and second order statistics (i.e., spectral means and variances) of known speech samples are known as hidden Markov model (HMM) recognizers. Each recognition model in this type of recognizer is an N-state statistical model (an HMM) which reflects these statistics. Each state of an HMM corresponds in some sense to the statistics associated with the temporal events of samples of a known word or subword. An HMM is characterized by a state transition matrix, A (which provides a statistical description of how new states may be reached from old states), and an observation probability matrix, B (which provides a description of which spectral features are likely to be observed in a given state). Scoring a test pattern reflects the probability of the occurrence of the sequence of features of the test pattern given a particular model. Scoring across all models may be provided by efficient dynamic programming techniques, such as Viterbi scoring. The HMM or sequence thereof which indicates the highest probability of the sequence of features in the test pattern occurring identifies the test pattern.

Hidden Markov models (HMMs) for automatic speech recognition (ASR) rely on high dimensional feature vectors to summarize the short-time, acoustic properties of speech. Though front-ends vary from speech recognizer to speech recognizer, the spectral information in each frame of speech is typically codified in a feature vector with thirty or more dimensions. In most systems, these vectors are conditionally modeled by mixtures of Gaussian probability density functions (PDFs). If so, the correlations between different features are represented in two ways; implicitly by the use of two or more mixture components, and explicitly by the non-diagonal elements in each covariance matrix. Naturally, these strategies for modeling correlations, implicit versus explicit, involve tradeoffs in accuracy, speed and memory.

Currently, most HMM-based recognizers do not include any explicit modeling of correlations; that is to say, conditioned on the hidden states, acoustic features are modeled by mixtures of Gaussian PDFs with diagonal covariance matrices. One reason for this practice is that the use of full covariance matrices imposes a heavy computational burden, making it difficult to achieve real-time speech recognition. Also, one rarely has enough training data to reliably estimate full covariance matrices. Some of these disadvantages can be overcome by parameter-tying (e.g., sharing the covariance matrices across different states or models), such as described in the article by Bellegarda, J., and Nahamoo, D., entitled "Tied mixture continuous parameter modeling for speech recognition," *IEEE Transactions on Acoustics, Speech, and Signal Processing* 38:2033–2045 (1990). But parameter-tying has its own drawbacks: it considerably complicates the training procedure, and it requires some artistry to know which states should and should not be tied.

SUMMARY OF THE INVENTION

Unconstrained and diagonal covariance matrices clearly represent two extreme choices for the hidden Markov modeling of speech. The statistical method of factor analysis represents a compromise between these two extremes. Factor analysis maps systematic variations of the data into a lower dimensional subspace enabling one to represent, in a very compact way, the covariance matrices for high dimensional data such as data representing speech. These matrices are expressed in terms of a small number of parameters that model the most significant correlations without incurring much overhead in time or memory.

According to an exemplary embodiment of the invention, a speech recognition system includes a speech recognizer. A memory coupled to the speech recognizer stores parameters of a set of hidden Markov models (HMMs). Each HMM is comprised of one or more units, where each unit is represented with one or more states using one or more mixture components per state. Using factor analysis, each mixture component is stored in the memory as a set of means, a set of variances (e.g., a diagonal covariance matrix) and a matrix of factors (i.e., a factor loading matrix) having a number of factors. The speech recognizer is operative to recognize testing or training speech signals representing speech and produce transcribed speech. The front-end of the speech recognition system includes a feature extractor coupled to the speech recognizer. A speech digitization and framing processor is coupled to the feature extractor. An acoustic transducer is coupled to an input of the speech digitization and framing processor. A training processor is coupled to another input of the speech digitization and framing processor.

During testing the system recognizes an unknown input speech to produce a transcription of the unknown input speech. The acoustic transducer converts the unknown input speech into a speech signal. The speech digitization and framing processor processes the speech signal to generate a series of frames. The feature extractor receives the series of frames and produces a sequence of feature vectors for the speech recognizer. The speech recognizer receives the sequence of feature vectors and produces a transcription of the speech using the set of HMMs stored in the memory.

During training, speech signals representing known speech are used by the system to make and modify the set of HMMs stored in the memory. A set of speech signals stored in the training processor are provided to the speech digitization and framing processor, where they are signal processed. The speech digitization and framing processor produces a series of frames based on the training speech signals. The feature extractor produces a sequence of feature vectors based on the series of frames received from the speech digitization and framing processor, which characterizes the speech signals from the training processor. The training speech signals presented to the speech digitization and framing processor represent known speech. The training processor monitors the speech recognizer and the HMM parameters stored in memory. The speech recognizer receives the sequence of feature vectors characterizing the training speech signals and produces a transcription based on the sequence of feature vectors. The training processor compares the transcription produced by the speech recognizer to the known speech, and adjusts the HMM parameters stored in the memory based on the results of the comparison.

Many differing techniques can be employed by the training processor for modifying the set of HMMs during training; an iterative technique is preferred. The HMMs can be trained using a Maximum Likelihood (ML) training process, or a discriminative training process such as Minimum Classification Error training. Each of the set of hidden Markov models (HMMs) stored in the memory is comprised of one or more units, where each unit is represented with one or more states using one or more mixture components per state. Using the Estimation Maximization (EM) technique for factor analysis a diagonal covariance matrix and a factor loading matrix, which emulate a full covariance matrix corresponding to each mixture component, are stored in the memory for each mixture component. The factors estimated using factor analysis to form the factor loading matrix for each mixture component provide a covariance structure for each covariance matrix. The number of factors per mixture component is adjusted based on the amount of training data for each state. The number of mixture components per state and the number of factors forming the matrix of factors for each mixture component can be varied in order to improve the accuracy of the speech recognition system when the diagonal covariance matrix and the matrix of factors for each mixture component are used during testing.

Other aspects and advantages of the invention will become apparent from the following detailed description and accompanying drawing, illustrating by way of example the features of the invention.

DETAILED DESCRIPTION

Figure 1:
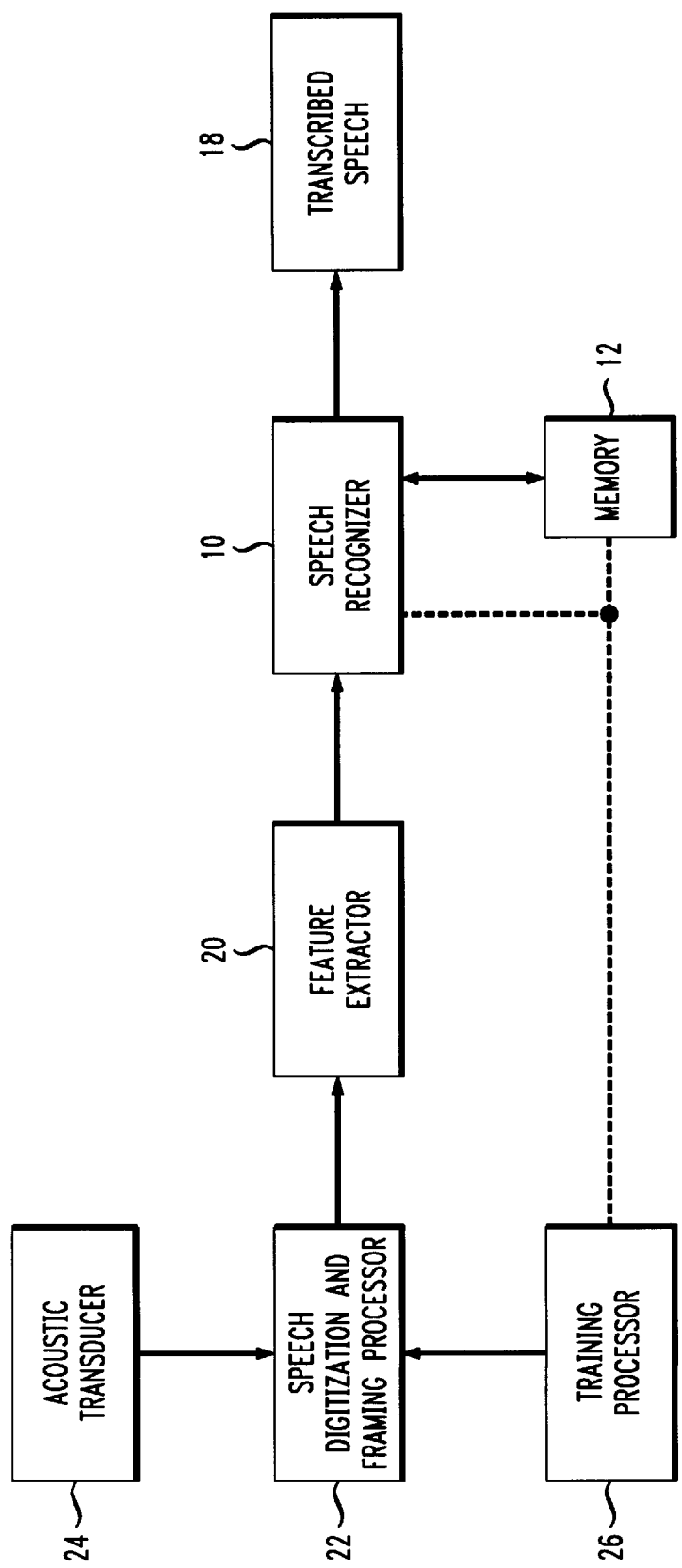
FIG. 1 is a schematic representation of a speech recognition system according to an exemplary embodiment of the invention.

For a better understanding of the invention, together with other and further objects, advantages, and capabilities thereof, reference is made to the following disclosure and the figures of the drawing. For clarity of explanation, the illustrative embodiments of the present invention are presented as comprising individual functional blocks. The functions these blocks represent may be provided through the use of either shared or dedicated hardware, including, but not limited to, hardware capable of executing software. For example, the functions of the blocks presented in FIG. 1 may be provided by a single shared processor. Illustrative embodiments may comprise digital signal processor (DSP) hardware, read-only memory (ROM) for storing software performing the operations discussed below, and random-access memory (RAM) for storing DSP results. Very large scale integration (VLSI) hardware embodiments, as well as custom VLSI circuitry in combination with a general purpose DSP circuit, may also be provided. Use of DSPs is advantageous since the signals processed represent real physical signals, processes and activities, such as speech signals, room background noise, etc.

The statistical method of factor analysis, such as described in the article by Rubin D., and Thayer, D., entitled "EM algorithms for factor analysis," *Psychometrika* 47: 69–76 (1982); and the article by Everitt, B. entitled "*An introduction to latent variable models*," London: Chapman and Hall (1984), is used in creating and representing continuous density HMMs for speech recognition applications. Applying factor analysis at the unit, state and mixture component level results in a powerful form of dimensionality reduction, one tailored to the local properties of speech.

FIG. 1 depicts a speech recognition system according to an exemplary embodiment of the invention. Referring to FIG. 1, a speech recognition system includes a speech recognizer 10. A memory 12 coupled to the speech recognizer 10 stores parameters of a set of hidden Markov models (HMMs). Each HMM is comprised of one or more units, where each unit is represented with one or more states using one or more mixture components per state.

Figure 2:
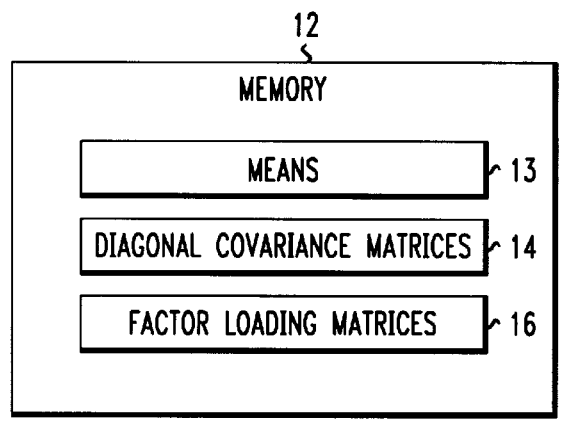
FIG. 2 is a schematic representation of a memory in the speech recognition system depicted in FIG. 1.

Referring to FIG. 2, using the statistical method of factor analysis each mixture component is stored in the memory 12 as a set of means 13, a set of variances (e.g., a diagonal covariance matrix 14) and a matrix of factors (i.e., a factor loading matrix 16) having a number of factors. The speech recognizer 10 is operative to recognize testing or training speech signals representing speech and produce transcribed speech 18.

The front-end of the speech recognition system depicted in FIG. 1 includes a feature extractor 20 coupled to the speech recognizer 10. A speech digitization and framing processor 22 is coupled to the feature extractor 20. An acoustic transducer 24 is coupled to the speech digitization and framing processor 22. A training processor 26 is coupled to the speech digitization and framing processor 22.

During testing the system recognizes an unknown input speech to produce a transcription of the unknown input speech. The acoustic transducer 24 converts the input speech into a speech signal. The speech digitization and framing processor 22 receives the speech signal and processes the signal. The waveform is first pre-emphasized, blocked into frames of thirty (30) ms periods at every ten (10) ms intervals and then Hamming windowed to generate a series of frames. The feature extractor 20 receives the series of frames and first performs autocorrelation analysis and then LPC cepstral analysis to produce a vector of twelve filtered cepstral coefficients. The cepstral coefficients are augmented with their normalized log energy value, along with their first and second order time derivatives to form a sequence of feature vectors for the speech recognizer 10. The speech recognizer 10 receives the sequence of feature vectors and produces a transcription 18 of the speech using the set of HMMs stored in the memory 12.

During training, speech signals representing known speech are used by the system to make and modify the set of HMMs stored in the memory 12. During training, a set of speech signals stored in the training processor 26 are provided to the speech digitization and framing processor 22 for signal processing. The speech digitization and framing processor 22 produces a series of frames based on the training speech signals. The feature extractor 20 produces a sequence of feature vectors based on the series of frames received from the speech digitization and framing processor 22, which characterizes the speech signals from the training processor 26.

During training, the training speech signals presented to the speech digitization and framing processor 22 represent known speech. The training processor 26 monitors the speech recognizer 10 and the HMM parameters stored in memory 12 during training. The speech recognizer 10 receives the sequence of feature vectors characterizing the training speech signals and produces a transcription 18 based on the sequence of feature vectors. The training processor 26 compares the transcription produced by the speech recognizer 10 to the known speech, and adjusts the HMM parameters stored in the memory 12 based on the results of the comparison.

Many differing techniques can be employed by the training processor 26 for modifying the set of HMMs stored in memory 12 during training; an iterative technique is preferred. The HMMs can be trained using a Maximum Likelihood Estimation (ML) training process, or a discriminative training process such as Minimum Classification Error training. Each of the set of hidden Markov models (HMMs) stored in the memory 12 is comprised of one or more units, where each unit is represented with one or more states using one or more mixture components per state. Using the Estimation Maximization (EM) technique for factor analysis diagonal covariance matrices 14 and factor loading matrices 16 are made to emulate a full covariance matrix for each mixture component. The factors estimated using factor analysis to form the factor loading matrix 16 for each mixture component provide a covariance structure for each diagonal covariance matrix 14. The number of factors per mixture component is adjusted based on the amount of training data for each state. The diagonal covariance matrix 14 and the matrix of factors 16 for each mixture component in the set of HMMs are used during testing. The number of mixture components per state and the number of factors forming the matrix of factors for each mixture component can be varied in order to improve the accuracy of the speech recognition system.

The invention provides a method of factor analysis for Gaussian random variables which can be applied to the hidden Markov modeling of speech. Factor analysis is a linear method for dimensionality reduction of Gaussian random variables. Let $x \in R_D$ denote a high dimensional Gaussian random variable. For simplicity, it is assumed that x has zero mean. If the number of dimensions, D, is very large, it may be prohibitively expensive to estimate, store, multiply, or invert a full covariance matrix. The idea behind factor analysis is to find a subspace of much lower dimension, f<D, that captures most of the variations in x. To this end, let $z \in R^f$ denote a low dimensional Gaussian random variable with zero mean and identity covariance matrix:

$$P(z) = \exp\{z^2/2\}/(2\pi)^{f/2} \qquad \text{(Eq. 1)}$$

We now imagine that the variable x is generated by a random process in which z is a latent (or hidden) variable; the elements of z are known as the factors. Let $\Lambda$ denote an arbitrary D x f matrix, and let $\psi$ denote a diagonal, positive-definite D x D matrix. We imagine that x is generated by sampling z from Eq. (1), computing the D-dimensional vector $\Lambda z$, then adding independent Gaussian noise (with variances $\psi_{ii}$) to each component of this vector. The matrix $\Lambda$ is known as the factor loading matrix. The relation between x and z is captured by the conditional distribution:

$$P(x|z) = \frac{\{|\Psi|^{-1/2}\}\exp\{-\frac{1}{2}(x-\Lambda z)^T \Psi^{-1}(x-\Lambda z)\}}{(2\pi)^{D/2}} \qquad \text{(Eq. 2)}$$

The marginal distribution for x is found by integrating out the hidden variable z. The calculation is straightforward because both P(z) and P(x|z) are Gaussian:

$$P(x) = \int dz P(x|z) P(z) \qquad \text{(Eq. 3)}$$

$$= \frac{|\Psi + \Lambda\Lambda^T|^{-1/2} \exp\{-\frac{1}{2}x^T(\Psi+\Lambda\Lambda^T)^{-1}x\}}{(2\pi)^{D/2}} \qquad \text{(Eq. 4)}$$

From Eq. (4), it can be seen that x is normally distributed with mean zero and covariance matrix $\psi+\Lambda\Lambda^T$. It follows that when the diagonal elements of $\psi$ are small, most of the variation in x occurs in the subspace spanned by the columns of $\Lambda$. The variances $\psi_{ii}$ measure the typical size of componentwise fluctuations outside this subspace.

Covariance matrices of the form $\psi+\Lambda\Lambda^T$ have a number of useful properties. Most importantly, they are expressed in terms of a small number of parameters, namely the D(f+1) non-zero elements of $\Lambda$ and $\psi$. If f<D, then storing $\Lambda$ and $\psi$ requires much less memory than storing a full covariance matrix. Likewise, estimating $\Lambda$ and $\psi$ also requires much less data than estimating a full covariance matrix. Covariance matrices of this form can be efficiently inverted using the matrix inversion lemma:

$$(\psi+\Lambda\Lambda^T)^{-1} = \psi^{-1} - \psi^{-1}\Lambda(I+\Lambda^T\psi^{-1}\Lambda)^{-1}\Lambda^T\psi^{-1} \qquad \text{(Eq. 5)}$$

where I is the fxf identity matrix. This decomposition also allows one to compute the probability P(x) with only O(fD) multiplies, as opposed to the O($D^2$) multiplies that are normally required when the covariance matrix is non-diagonal.

Maximum likelihood estimates of the parameters $\Lambda$ and $\psi$ are obtained by an EM procedure. Let $\{x_t\}$ denote a sample of data points (with mean zero). The EM procedure is an iterative procedure for maximizing the log-likelihood, $\Sigma_t \ln P(x_t)$, with $P(x_t)$ given by Eq. (4). The E-step of this procedure is to compute:

$$Q(\Lambda',\psi';\Lambda,\psi) = \Sigma_t \Theta dz P(z|x_t,\Lambda,\psi) \ln P(z,x_t|\Lambda',\psi'). \qquad \text{(Eq. 6)}$$

The right hand side of Eq. (6) depends on $\Lambda$ and $\psi$ through the statistics:

$$E[z|x_t] = [I+\Lambda^T\psi^{-1}\Lambda]^{-1}\Lambda^T\psi^{-1}x_t, \qquad \text{(Eq. 7)}$$

$$E[zz^T|x_t] = [I+\Lambda^T\psi^{-1}\Lambda]^{-1} + E[z|x_t]E[z^T|x_t]. \qquad \text{(Eq. 8)}$$

Here, $E[\cdot|x_t]$ denotes an average with respect to the posterior distribution, $P(z|x_t,\Lambda,\psi)$. The M-step of the EM algorithm is to maximize the right hand side of Eq. (6) with respect to $\psi'$ and $\Lambda'$. This leads to the iterative updates:

$$\Lambda' = (\Sigma_t x_t E[z^T|x_t])(\Sigma_t E[zz^T|x_t])^{-1}, \quad \text{(Eq. 9)}$$

$$\psi' = \text{diag}\{(1/N)\Sigma_t x_t x_t^T - \Lambda' E[z|x_t]x_t^T]\}, \quad \text{(Eq. 10)}$$

where N is the number of data points, and $\psi'$ is constrained to be purely diagonal. These updates are guaranteed to converge monotonically to a (possibly local) maximum of the log-likelihood.

Consider a continuous density HMM whose feature vectors, conditioned on the hidden states, are modeled by mixtures of Gaussian probability density functions (PDFs). If the dimensionality of the feature space is very large, we can make use of the parameterization in Eq. (4). Each mixture component thus obtains its own mean, variances, and factor loading matrix. Taken together, these amount to a total of C(f+2)D parameters per mixture model, where C is the number of mixture components, f the number of factors, and D the dimensionality of the feature space. Note that these models capture feature correlations in two ways: implicitly, by using two or more mixture components, and explicitly, by using one or more factors.

It is straightforward to integrate the EM technique for factor analysis into the training of HMMs. Suppose that $S = \{x_t\}$ represents a sequence of acoustic vectors. The forward-backward procedure enables one to compute the posterior probability, $\gamma_t^{sc} = P(S_t = s, c_t = c|S)$, that the HMM used state s and mixture component c at time t. The updates for the matrices $\Lambda^{sc}$ and $\psi^{sc}$ (within each state and mixture component) have essentially the same form as Eqs. (9–10), except that now each observation $x_t$ is weighted by the posterior probability, $\gamma_t^{sc}$. Additionally, one must take into account that the mixture components have non-zero means.

Clearly, an important consideration when applying factor analysis to speech is the choice of acoustic features. A standard choice, and the one used in our experiments, is a thirty-nine dimensional feature vector that consists of twelve cepstral coefficients (with first and second derivatives) and the normalized log-energy (with first and second derivatives). There are known to be correlations between these features, especially between the different types of coefficients (e.g., cepstrum and delta-cepstrum). While these correlations have motivated our use of factor analysis, it is worth emphasizing that the method applies to arbitrary feature vectors. Indeed, whatever features are used to summarize the short-time properties of speech, one expects correlations to arise from coarticulation, background noise, speaker idiosyncrasies, etc.

Continuous density HMMs with diagonal and factored covariance matrices were trained to recognize alphanumeric strings (e.g., N Z 3 V J 4 E 3 U 2). Highly confusable letters such as B/V, C/Z, and M/N make this a challenging problem in speech recognition. The training and test data were recorded over a telephone network and consisted of fourteen thousand six hundred twenty-two (14622) and seven thousand two hundred fifty-five (7255) utterances, respectively. Recognizers were built from two hundred eighty-five (285) left-to-right HMMs trained by maximum likelihood estimation; each HMM modeled a context-dependent sub-word unit. Testing was done with a free grammar network (i.e., no grammar constraints). We ran several experiments, varying both the number of mixture components and the number of factors. The goal was to determine the best model of acoustic feature correlations.

Figure 3:
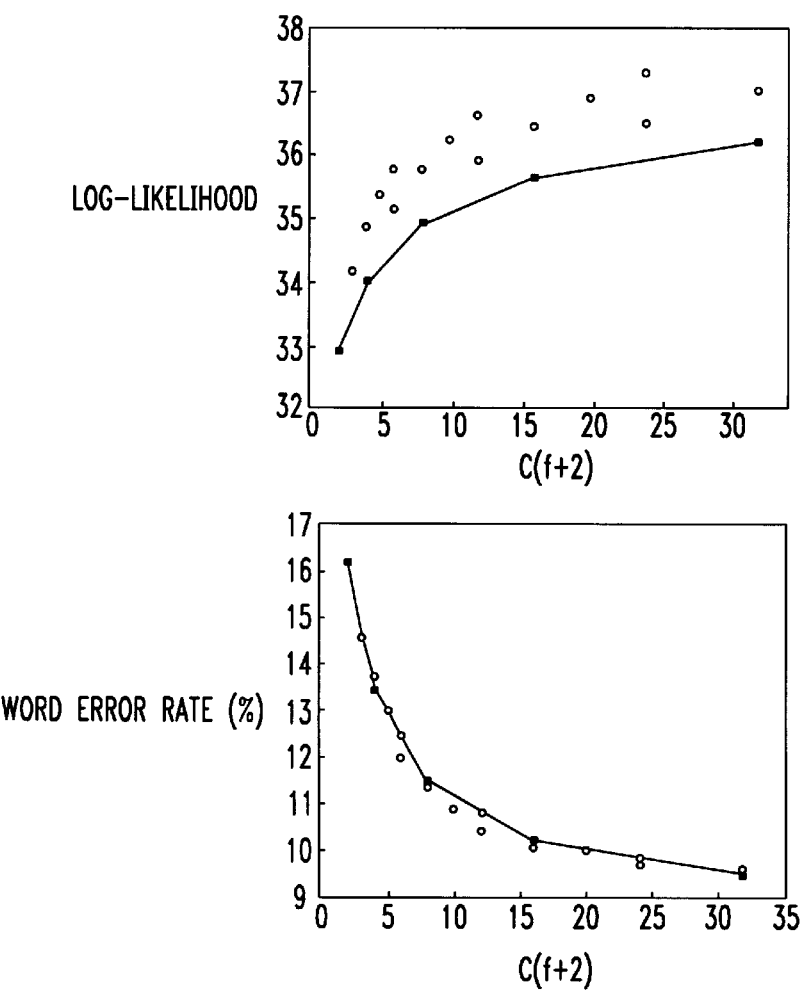
FIG. 3 presents plots of log-likelihood scores and word error rates on a test set versus the number of parameters per mixture model.

FIG. 3 shows plots of log-likelihood scores and word error rates on the test set versus the number of parameters per mixture model (divided by the number of features). In FIG. 3 the stars indicate models with diagonal covariance matrices; the circles indicate models with factor analysis.

These results include only the recognizers in TABLE 1.

TABLE 1

| C | f | C (f + 2) | word error (%) | log-likelihood | CPU time(sec) |
|---|---|---|---|---|---|
| 1 | 0 | 2 | 16.2 | 32.9 | 25 |
| 1 | 1 | 3 | 14.6 | 34.2 | 30 |
| 1 | 2 | 4 | 13.7 | 34.9 | 30 |
| 1 | 3 | 5 | 13.0 | 35.3 | 38 |
| 1 | 4 | 6 | 12.5 | 35.8 | 39 |
| 2 | 0 | 4 | 13.4 | 34.0 | 30 |
| 2 | 1 | 6 | 12.0 | 35.1 | 44 |
| 2 | 2 | 8 | 11.4 | 35.8 | 48 |
| 2 | 3 | 10 | 10.9 | 36.2 | 61 |
| 2 | 4 | 12 | 10.8 | 36.6 | 67 |
| 4 | 0 | 8 | 11.5 | 34.9 | 46 |
| 4 | 1 | 12 | 10.4 | 35.9 | 80 |
| 4 | 2 | 16 | 10.1 | 36.5 | 93 |
| 4 | 3 | 20 | 10.0 | 36.9 | 132 |
| 4 | 4 | 24 | 9.8 | 37.3 | 153 |
| 8 | 0 | 16 | 10.2 | 35.6 | 93 |
| 8 | 1 | 24 | 9.7 | 36.5 | 179 |
| 8 | 2 | 32 | 9.6 | 37.0 | 226 |
| 16 | 0 | 32 | 9.5 | 36.2 | 222 |

TABLE 1 summarizes the results of these experiments for different recognizers. The columns from left to right show the number of mixture components, the number of factors, the number of parameters per mixture model (divided by the feature dimension, i.e., the number of features), the word error rates (including insertion, deletion, and substitution errors) on the test set, the average log-likelihood scores per frame of speech on the test set, and the CPU time to recognize twenty test utterances (on an SGI R4000). Not surprisingly, the word accuracies and likelihood scores increase with the number of modeling parameters; likewise, so do the CPU times. The most interesting comparisons are between models with the same number of parameters (e.g., four mixture components with no factors versus two mixture components with two factors). The left graph in FIG. 3 shows a plot of the average lot-likelihood versus the number of parameters per mixture model; the stars and circles in this plot indicate models with and without diagonal covariance matrices, respectively. One sees quite clearly from this plot that given a fixed number of parameters, models with non-diagonal (i.e., factored) covariance matrices tend to have higher likelihoods. The right graph in FIG. 3 shows a similar plot of the word error rates versus the number of parameters.

It is worth noting that the above experiments used a fixed number of factors per mixture component. In fact, because the variability of speech is highly context-dependent, it makes sense to vary the number of factors, even across states within the same HMM. A simple heuristic taught herein is to adjust the number of factors depending on the amount of training data for each state (as determined by an initial segmentation of the training utterances). This heuristic was found to lead to more pronounced differences in likelihood scores and error rates. In particular, substantial improvements were observed for three recognizers whose HMMs employed an average of two factors per mixture component. TABLE 2 summarizes these results for recognizers with variable numbers of factors; f denotes the average number of factors per mixture component.

TABLE 2

| C | f | C(f + 2) | word error (%) | log-likelihood | CPU time(sec) |
|---|---|---|---|---|---|
| 1 | 2 | 4 | 12.3 | 35.4 | 32 |
| 2 | 2 | 8 | 10.5 | 36.3 | 53 |
| 4 | 2 | 16 | 9.6 | 37.0 | 108 |

It should be noted that these recognizers are extremely competitive in all aspects of performance (accuracy, memory, and speed) with the baseline (zero factor) models in TABLE 1.

The combined use of mixture densities and factor analysis for speech recognition has been described in the framework of hidden Markov modeling, where acoustic features are conditionally modeled by mixtures of Gaussian PDFs. Mixture densities and factor analysis are complementary means of modeling acoustic correlations; and, when used together, they can lead to smaller, faster, and more accurate recognizers than either method on its own.

The invention also contemplates discriminative methods for training HMMs with factor analysis to optimize an objective function that more directly relates to the goal of minimizing classification errors.

We have so far discussed models with "factored" covariance matrices and "diagonal" covariance matrices, both having the same number of overall parameters. The factored models were observed to produce significantly higher likelihood scores. However, experiments showed that modeling acoustic correlations with factor analysis (as opposed to more mixture components) sometimes leads to only minor improvements in recognition accuracy. Maximizing a likelihood function in factor analysis might not always directly translate into lower error rates.

According to another aspect of the invention, the use of factor analysis in HMM-based speech recognition is extended by introducing a discriminative objective function that more directly relates to the empirical error rate. Let $\Phi=\{\mu, \psi, \Lambda\}$; the objective is to minimize the loss function:

$$J=\Sigma_i\Sigma_t l_i(x_t;\Phi)\cdot\partial(x_t\epsilon C_i), \quad \text{(Eq. 11)}$$

where $l_i(x_t;\Phi)$ is a smooth function for class $C_i$, s.t.:

$$l_i(x_t;\Phi)=1/(1+\exp\{-\alpha d_i(x_t;\Phi)+\beta\}). \quad \text{(Eq. 12)}$$

Here, $\alpha$ and $\beta$ are constants which control the slope and the shift of the smoothing function, respectively. $d_i(x_t;\Phi)$ is a misclassification measure which is defined as the log-likelihood ratio between the correct string hypothesis and other competing hypotheses to class $C_i$. The use of discriminative training in factor analysis will be referred to as minimum classification error (MCE) factor analysis.

Minimizing the value of the function J in Eq. (11) with respect to the parameters $\Phi$ is achieved by standard gradient descent, such that descent, such that at the $n^{th}$ iteration:

$$\Phi_n=\Phi_{n-1}-\epsilon(\partial J/\partial\Phi)|_{101-\Phi n}, \quad \text{(Eq. 13)}$$

where $\epsilon$ is a positive learning rate. Decomposing the partial derivative $\partial J/\partial\Phi$ using the chain rule, $$(\partial J/\partial\Phi)=(\partial J/\partial \log P(x))\cdot(\partial \log P(x)/\partial\Phi) \quad \text{(Eq. 14)}$$

and defining $M \underline{\Delta}(\Lambda\Lambda^T+\psi)$, we obtain with some manipulation:

$$\partial \log P(x)/\partial\mu_i=[M^{-1}(x-\mu)]_i, \quad \text{(Eq. 15)}$$

$$\partial \log P(x)/\partial\psi_i=\frac{1}{2}\{[M^{-1}(x-\mu)]_i^2-M_{ii}^{-1}\}, \quad \text{(Eq. 16)}$$

$$\partial \log P(x)/\partial\Lambda_{ij}=[M^{-1}(x-\mu)]_i[\Lambda M^{-1}(x-\mu)]_j-[M^{-1}\Lambda]_{ij}, \quad \text{(Eq. 17)}$$

where [·]; is the $i^{th}$ element of the vector. Note that when performing minimum classification error (MCE) factor analysis, gradient descent was adopted on the transformed parameters: $\mu\rightarrow\mu=\psi^{-1}\mu$, $\psi\rightarrow\psi=\log \psi$, and $\Lambda\rightarrow\Lambda=\psi^{-1}\Lambda$. This was done to enforce non-negativity constraints and to accelerate convergence.

Telephone speech from two separate data collections was used in an experimental study. The first collection consisted of twelve thousand one hundred (12,100) general phrases ranging from two to four (2–4) words. It represented two thousand five hundred (2,500) completed calls from seven major dialect regions in the United States. This collection, which was assigned for training only, was carefully designed so that a fairly even coverage was obtained in terms of age, gender and triphone units. The second collection consisted of two thousand four hundred twenty-six (2,426) isolated phrases representing one thousand two hundred nineteen (1219) New Jersey town names. This collection was obtained from nearly one hundred (100) speakers and was assigned for testing only. For both collections, most calls were digitized at the caller's local switch and remained that way until the point they were captured.

Signal processing the speech data was conducted as follows: the waveform was first pre-emphasized, blocked into frames of thirty (30) ms periods at every ten (10) ms intervals and then Hamming windowed. For each frame, we performed autocorrelation analysis and then LPC cepstral analysis to produce a vector of twelve filtered cepstral coefficients. Finally, the cepstral coefficients were augmented with their normalized log energy value, along with their first and second order time derivatives to form the input feature vector for the HMM speech recognizer.

In the remaining part of this section, two sets of experiments will be described which (i) investigate the effect of using "factored" covariance matrices in HMMs, and (ii) compare the performance of models trained with maximum likelihood (ML) estimation factor analysis versus minimum classification error (MCE) factor analysis.

The HMM system consisted of forty-three (43) context-independent units, each corresponding to an English phone. Each unit was represented with three left-to-right non-skipping states, with the exception of the silence/background unit which included a single state. The baseline system used C mixture components per state, each having a diagonal covariance matrix. The parameters of this system were estimated using standard maximum likelihood training. When introducing factor analysis, the covariance structure was described by adding f factors which were estimated using the expectation maximization (EM) technique.

A comparison between models with factored and diagonal covariance matrices is presented in TABLE 3.

TABLE 3

| | Diagonal HMM | | Factored HMM | |
|---|---|---|---|---|
| | 4 mix | 8 mix | 4 mix | 8 mix |
| ML | 20.7 | 18.0 | 19.0 | 16.0 |
| MCE | 17.6 | 16.0 | 15.1 | 12.7 |

TABLE 3 shows experimental results following maximum likelihood (ML) training and minimum classification error (MCE) training for models with diagonal and factored covariance matrices. The results represent the average word error rate for the following settings: C=4, f=0; C=4, f=1; C=8, f=0; C=8, f=1. Whether using four or eight mixture components per state, it is clear that explicit modeling of acoustic correlation by factor analysis results in about 10% reduction in the word error rate.

The primary advantage that minimum classification error factor analysis provides over maximum likelihood factor analysis comes from the use of an optimization function that is more geared towards minimizing an empirical error rate. As we are dealing with task-independent training and in order to improve the generalization ability of the acoustic models, in general, the minimum classification error objective function in Eq. (11) has been expressed in terms of a sequence of phones, as opposed to words, as described in the article by C.-H. Lee, B.-H. Juang, W. Chou, and J. J. Molina-Perez, entitled "A study on task-independent subword selection and modeling for speech recognition", *Proc. ICSLP '96*, pp. 1820–1823 (1996). Therefore, the misclassification measure becomes essentially a log likelihood ratio between a sequence of phones that correspond to the correct hypothesis and competing hypotheses phone strings.

Starting with the models made by maximum likelihood (ML) training as the seed, five iterations of minimum classification error (MCE) training were performed over the entire training set. The results for models with and without factored covariance matrices are presented in TABLE 3. These results show that (a) minimum classification error (MCE) training helps to improve system performance whether or not factor analysis is being used, and (b) minimum classification error (MCE) factor analysis results in a further 20%–25% drop in the word error rate over maximum likelihood (ML) factor analysis. In addition, for a given beam width, the factored models have been observed to run 6% faster than the diagonal models when adopting the same number of parameters.

In light of the above, it will be appreciated that the principles of the invention are also applicable to a speaker identification process for confirming the claimed identity of an individual.

While several particular forms of the invention have been illustrated and described, it will also be apparent that various modifications can be made without departing from the spirit and scope of the invention.

What is claimed is:

1. A method for recognizing speech, comprising the steps of:
   deploying a speech recognizer and a memory coupled to the speech recognizer storing a set of HMMs, each HMM comprising one or more units, each unit represented with one or more states using one or more mixture components per state;
   storing each mixture component in said memory as a set of means, a set of variances and a matrix of factors having a number of factors; and
   recognizing speech using the speech recognizer.

2. A method as defined in claim 1, wherein:
   the set of variances and the matrix of factors for each mixture component emulate a full covariance matrix that has been reduced in dimensionality by factor analysis.

3. A method as defined in claim 1, further comprising the step of:
   using factor analysis to make the set of variances and the matrix of factors.

4. A method as defined in claim 1, further comprising the step of:
   using the set of variances and the matrix of factors to emulate a full covariance matrix.

5. A speech recognition system, comprising:
   a feature extractor which produces a sequence of feature vectors representing speech;
   a speech recognizer coupled to the feature extractor, which receives the sequence of feature vectors and produces a transcription of the speech;
   a memory coupled to the speech recognizer which stores a set of HMMs, each HMM comprising one or more units, each unit represented with one or more states using one or more mixture components per state; and
   a set of variances and a matrix of factors stored in the memory for each mixture component, emulating a full covariance matrix corresponding to the mixture component.

6. A system as defined in claim 5, wherein:
   each mixture component is a Gaussian probability density function.

7. A system as defined in claim 5, wherein:
   the full covariance matrix corresponding to each mixture component is stored in the memory in a condensed form using factor analysis.

8. A system as defined in claim 7, wherein:
   the condensed form includes the set of variances and the matrix of factors.

9. A method of making an HMM stored in a memory for use in a speech recognition system, wherein the HMM comprising one or more units, each unit represented with one or more states using one or more mixture components per state, the method comprising the steps of:
   determining a set of parameters for each mixture component from training data; and
   storing the set of parameters for each mixture component in the memory in a condensed form using factor analysis.

10. A method as defined in claim 9, wherein:
    each mixture component is a Gaussian probability density function.

11. A method as defined in claim 9, wherein:
    the condensed form comprises a set of variances and a matrix of factors which correspond to a full covariance matrix reduced in dimensionality by factor analysis.

12. A method as defined in claim 9, further comprising the step of:
    converting the set of parameters for each mixture component into a set of variances and a matrix of factors.

13. A method as defined in claim 9, further comprising the step of:
    adjusting one or more parameters based on additional training data.

14. A method of making a set of HMMs stored in a memory for use in a speech recognition system, the set of HMMs comprising one or more units, each unit represented with one or more states using one or more mixture components per state, and each mixture component comprising a diagonal covariance matrix, the method comprising the steps of:
    determining parameters of the diagonal covariance matrix for each mixture component from training data;
    estimating a number of factors using factor analysis to form a matrix of factors for each mixture component which provides a covariance structure for each diagonal covariance matrix; and
    storing the diagonal covariance matrix and the matrix of factors for each mixture component in the memory.

15. A method as defined in claim 14, further comprising the step of:
varying the number of mixture components per state.

16. A method as defined in claim 14, further comprising the step of:
varying the number of factors forming the matrix of factors for each mixture component.

17. A method as defined in claim 14, further comprising the step of:
adjusting the number of factors per mixture component based on the amount of training data for each state.

18. A method as defined in claim 14, further comprising the step of:
training the set of HMMs using a maximum likelihood training process.

19. A method as defined in claim 14, further comprising the step of:
training the set of HMMs using a discriminative training process.

20. A method as defined in claim 19, wherein:
the discriminative training process includes minimum classification error training.

21. A speech recognizer, comprising:
a set of recognition models, each recognition model having one or more states, each state represented by one or more mixture components, wherein each mixture component is stored in a memory as a set of variances and a matrix of factors to emulate a full covariance matrix.

22. A speech recognizer as defined in claim 21, wherein:
each recognition model is an HMM.

23. A speech recognizer as defined in claim 21, wherein:
each mixture component is a Gaussian probability density function.

24. A speech recognizer as defined in claim 21, wherein:
the recognition models are produced by a maximum likelihood training process.

25. A speech recognizer as defined in claim 21, wherein:
the recognition models are produced by a discriminative training process.

26. A speech recognizer as defined in claim 25, wherein:
the discriminative training process includes minimum classification error training.

27. A speech recognizer as defined in claim 21, wherein:
each matrix of factors having a uniform number of factors per mixture component.

28. A method for use in a speech recognition system, the speech recognition system comprising a speech recognizer and a memory coupled to the speech recognizer storing a set of HMMs, each HMM comprising one or more units, each unit represented with one or more states using one or more mixture components per state, the method comprising the step of:
applying factor analysis at a level of the set of HMMs selected from the group consisting of the unit level, the state level or the mixture component level.

* * * * *